(12) United States Patent
Schmidt et al.

(10) Patent No.: US 10,129,316 B2
(45) Date of Patent: Nov. 13, 2018

(54) SERVER SIDE ADAPTIVE BIT RATE CONTROL FOR HTTP STREAMING CLIENTS

(71) Applicant: ARRIS Enterprises LLC, Suwanee, GA (US)

(72) Inventors: Mark S. Schmidt, San Diego, CA (US); Praveen N. Moorthy, San Diego, CA (US); Ajay Luthra, San Diego, CA (US); Paul Moroney, La Jolla, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/682,068

(22) Filed: Aug. 21, 2017

(65) Prior Publication Data
US 2017/0346874 A1    Nov. 30, 2017

Related U.S. Application Data

(63) Continuation of application No. 14/750,097, filed on Jun. 25, 2015, now Pat. No. 9,769,235.

(60) Provisional application No. 62/017,380, filed on Jun. 26, 2014.

(51) Int. Cl.
*H04L 29/06* (2006.01)
*H04N 21/2343* (2011.01)

(52) U.S. Cl.
CPC ........ *H04L 65/607* (2013.01); *H04L 65/4069* (2013.01); *H04N 21/2343* (2013.01)

(58) Field of Classification Search
CPC .............. H04L 65/4069; H04L 65/607; H04N 21/2343
See application file for complete search history.

(56) References Cited

U.S. PATENT DOCUMENTS

| 8,051,454 | B2 | 11/2011 | Krikorian et al. |
| 2006/0095944 | A1 | 5/2006 | Demircin et al. |
| 2007/0115814 | A1 | 5/2007 | Gerla et al. |
| 2013/0044801 | A1 | 2/2013 | Cote et al. |
| 2014/0109153 | A1 | 4/2014 | Venkatraman et al. |
| 2014/0129825 | A1 | 5/2014 | Losev et al. |

FOREIGN PATENT DOCUMENTS

| EP | 2566172 A1 | 3/2013 |
| EP | 2698994 A2 | 2/2014 |

*Primary Examiner* — Joe Chacko
(74) *Attorney, Agent, or Firm* — Thomas A. Ward

(57) ABSTRACT

Methods and systems are described for adaptively transmitting streaming data to a client. In one embodiment, the method comprises receiving, in a server, a request for a data asset from the client, transcoding at least an segment of the data asset according to initial transcoding parameters, transmitting a first fragment of the transcoded segment of the data asset from the server to the client over a communication channel, generating an estimate of a bandwidth of the communications channel at least in part from information acknowledging reception of at least the first fragment of the transcoded segment of the data asset by the client, generating adaptive transcoding parameters at least in part from an estimate of a bandwidth of the communications channel, the estimate generated at the server, transcoding a further segment of the data asset according to the adaptive transcoding parameters, and transmitting the further segment of the data asset.

9 Claims, 10 Drawing Sheets

| TIME STAMP (SECS) | CLIENT IP (PORT) 192.168.1.4 | | ABR SERVER IP (PORT) 192.168.1.7 |
|---|---|---|---|
| 0.000000 | (63169) | GET chunk_000001.ts ──────────▶ (80) | Seq = 294 Ack = 435 |
| 0.000828 | (63169) | ◀── ACK - Len: 1448 ── (80) | Seq = 435 Ack = 597 |
| 0.000839 | (63169) | ◀── ACK - Len: 1448 ── (80) | Seq = 1883 Ack = 597 |
| 0.001109 | (63169) | ◀── ACK - Len: 1448 ── (80) | Seq = 3331 Ack = 597 |
| 0.001307 | (63169) | ◀── ACK - Len: 1448 ── (80) | Seq = 4779 Ack = 597 |
| 0.002554 | (63169) | ◀── ACK - Len: 1448 ── (80) | Seq = 6227 Ack = 597 |
| 0.003781 | (63169) | ◀── ACK - Len: 1448 ── (80) | Seq = 7675 Ack = 597 |
| 0.005015 | (63169) | ◀── ACK - Len: 1448 ── (80) | Seq = 9123 Ack = 597 |
| 0.005664 | (63169) | ── ACK ──────────▶ (80) | Seq = 597 Ack = 3331 |
| 0.005675 | (63169) | ── ACK ──────────▶ (80) | Seq = 597 Ack = 6227 |
| 0.005679 | (63169) | ── ACK ──────────▶ (80) | Seq = 597 Ack = 7675 |
| 0.006269 | (63169) | ◀── ACK - Len: 1448 ── (80) | Seq = 10571 Ack = 597 |
| 0.007455 | (63169) | ◀── ACK - Len: 1448 ── (80) | Seq = 12019 Ack = 597 |
| ⋮ | ⋮ | ⋮ | ⋮ |
| 0.125028 | (63169) | ◀── ACK - Len: 1448 ── (80) | Seq = 150461 Ack = 597 |
| 0.126228 | (63169) | ◀── ACK - Len: 1448 ── (80) | Seq = 151909 Ack = 597 |
| 0.126924 | (63169) | ── ACK ──────────▶ (80) | Seq = 597 Ack = 143221 |
| 0.126933 | (63169) | ── ACK ──────────▶ (80) | Seq = 597 Ack = 146117 |
| 0.126935 | (63169) | ── ACK ──────────▶ (80) | Seq = 597 Ack = 149013 |
| 0.127320 | | ACK | Seq = 597 Ack = 151909 |

*FIG. 4*

SERVER SIDE ADAPTIVE BIT RATE CONTROL FOR HTTP STREAMING CLIENTS

CROSS-REFERENCE TO RELATED APPLICATIONS

This continuation application claims benefit of U.S. patent application Ser. No. 14/750,097, as filed on Jun. 25, 2017 and U.S. Provisional Patent Application No. 62/017,380, entitled "SERVER-SIDE ADAPTIVE BIT RATE CONTROL FOR HTTP STREAMING CLIENTS," by Mark S. Schmidt, Praveen N Moorthy, Ajay Luthra, and Paul Moroney, filed Jun. 26, 2014, which application is hereby incorporated by reference herein.

BACKGROUND OF THE INVENTION

1. Field of the Invention

The present invention relates to systems and methods for adaptive bit encoding of digital media streams, and in particular to a system and method for server-side adaptive bit encoding of such streams.

2. Description of the Related Art

The dissemination and playback of media programs has undergone substantial changes in the past decade. Previously, media programs (which may include audio, video, or both) were disseminated either by analog broadcast (conventional, satellite, or cable) or by dissemination of physical copies of the media programs to presentation locations such as theaters. Digital technologies have had a profound effect on the dissemination and playback of media programs.

In particular, digital technology (with improved bandwidth and improved compression/decompression techniques) has permitted the dissemination and playback of media programs via the Internet. These methods of dissemination and playback have become competitive with traditional means. Dissemination of media programs via the Internet may occur either by simple downloading, progressive downloading or streaming.

Simple downloading downloads the bytes of the media file in any convenient order, while progressive download downloads bytes at the beginning of a file and continues downloading the file sequentially and consecutively until the last byte. At any particular time during simple downloading, portions of the file is not be immediately available for playback because the entire file must be downloaded first before a media player can start playback.

With progressive downloading, a media file having the media program is downloaded via the Internet using dial-up, DSL, ADSL, cable, T1, or other high-speed connection. Such downloading is typically performed by a web server via the Internet. Media players are able to start playback once enough of the beginning of the file has downloaded, however, the media player must download enough information to support some form of playback before playback can occur. Playback of progressively downloaded media files is often delayed by slow Internet connections and is also often choppy and/or contains a high likelihood of stopping after only a few seconds. Once a progressively downloaded media program has been completely downloaded, it may be stored on the end-user computer for later use.

One of the disadvantages of a progressive downloading is that the entity transmitting the data (the web server) simply pushes the data to the client as fast as possible. It may appear to be "streaming" the video because the progressive download capability of many media players allows playback as soon as an adequate amount of data has been downloaded. However, the user cannot fast-forward to the end of the file until the entire file has been delivered by the web server, and the web server does not make allowances for the data rate of the video file. For example, if the network bandwidth is lower than the data rate required by the video file, the user would have to wait a longer period of time before playback can begin, and may experience choppy "on and off" playback.

Web servers typically use HTTP (hypertext transport protocol) on top of TCP (transfer control protocol) to transfer files over the network. TCP, which controls the transport of data packets over the network, is optimized for guaranteed delivery of data, not speed. Therefore, if a browser senses that data is missing, a resend request will be issued and the data will be resent. In networks with high delivery errors, resend requests may consume a large amount of bandwidth. Since TCP is not designed for efficient delivery of adequate data or bandwidth control (but rather guaranteed delivery of all data), it is not preferred for the delivery of video data in all applications.

Streaming delivers media content continuously to a media player and media playback occurs simultaneously. The end-user is capable of playing the media immediately upon delivery by the content provider. Traditional streaming techniques originate from a single provider delivering a stream of data to a set of end-users. High bandwidths and central processing unit (CPU) power are required to deliver a single stream to a large audience, and the required bandwidth of the provider increases as the number of end-users increases.

Unlike progressive downloading, streaming media can be delivered on-demand or live. Wherein progressive download requires downloading the entire file or downloading enough of the entire file to start playback at the beginning, streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities.

A streaming media server is a specialized device that accepts requests for video files, and with information about the format, bandwidth and structure of those files, can deliver just the amount of data necessary to play the video, at the rate needed to play it. Streaming media servers may also account for the transmission bandwidth and capabilities of the media player. Unlike the web server, the streaming media sever communicates with the client computer using control messages and data messages to adjust to changing network conditions as the video is played.

Streaming media servers may use HTTP and TCP to deliver video streams, but generally use RSTP (real time streaming protocol) and UDP (user datagram protocol). These protocols permit control messages and save bandwidth by reducing overhead. Unlike TCP, when data is dropped during transmission, UDP does not transmit resent requests. Instead, the server continues to send data.

Other streaming protocols that were developed primarily for mobile devices, are also in use. One such protocol is HTTP Live Streaming (HLS). HLS is an HTTP-based media streaming communications protocol implemented by APPLE INC. as a part of their QUICKTIME, SAFARI, OS-X and iOS software. With HLS, the media program is broken down into a sequence of small HTTP-based files, each representing a temporal "chunk" of the media program. For each temporal chunk, a number of different versions are created in advance, each created with different transcoding parameters, and optimized for different transmission bandwidth. As the stream is played, the client may select from one of these alternate chunks (which contain the same material encoded at a variety of data rates), allowing the client to adapt the streaming session to the available data rate. At the start of the streaming session, the client downloads an extended M3U playlist containing the metadata for the various "chunks" that are available. Such formats do not inherently support server-side adaptive bit rate control, even though the need for such adaptive bit rate control in such applications is often greater than it is for non-mobile devices.

Accordingly, there is a need in the art for a method and apparatus for server-side adaptive bit rate control in HLS and similar protocols. Described below is a method and apparatus that satisfies this need.

SUMMARY

To address the requirements described above, the present invention discloses a method and apparatus for adaptively transmitting streaming data to a client. In one embodiment, the method comprises receiving, in a server, a request for a data asset from the client, transcoding at least a segment of the data asset according to initial transcoding parameters, transmitting a first fragment of the transcoded segment of the data asset from the server to the client over a communication channel, generating an estimate of a bandwidth of the communications channel at least in part from information acknowledging reception of at least the first fragment of the transcoded segment of the data asset by the client, generating adaptive transcoding parameters at least in part from an estimate of a bandwidth of the communications channel, the estimate generated at the server, transcoding a further segment of the data asset according to the adaptive transcoding parameters, and transmitting the further segment of the data asset. Another embodiment is evidenced by an apparatus comprising a processor communicatively coupled to a memory storing processor instructions for performing the foregoing operations.

BRIEF DESCRIPTION OF THE DRAWINGS

Referring now to the drawings in which like reference numbers represent corresponding parts throughout:

FIG. 4 is a diagram illustrating an example of how a typical bandwidth measurement can be derived from a TCP flowgraph of a chunk download;

DETAILED DESCRIPTION

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

A method and apparatus for server-side control of transcoder video and audio bit rate and resolution with possible client-side assist and multiplexing of audio/video or audio-only for delivery to client players over IP and HTTP is described below. The server application measures the network bandwidth available to the individual client for HTTP segmented downloads of media files and accordingly adjusts stream bit rate and composition to allow the client to retrieve media segments with sufficient time margin to minimize the occurrence of underflow of client playback buffers. Embodiments include streaming over cellular (LTE, 3G) and WiFi networks to Apple HTTP Live Streaming (HLS) clients, Microsoft Smooth Streaming (MSS) clients, MPEG Dynamic Adaptive Streaming over HTTP (DASH) clients, and Adobe HTTP Dynamic Streaming (HDS) clients.

Figure 1:
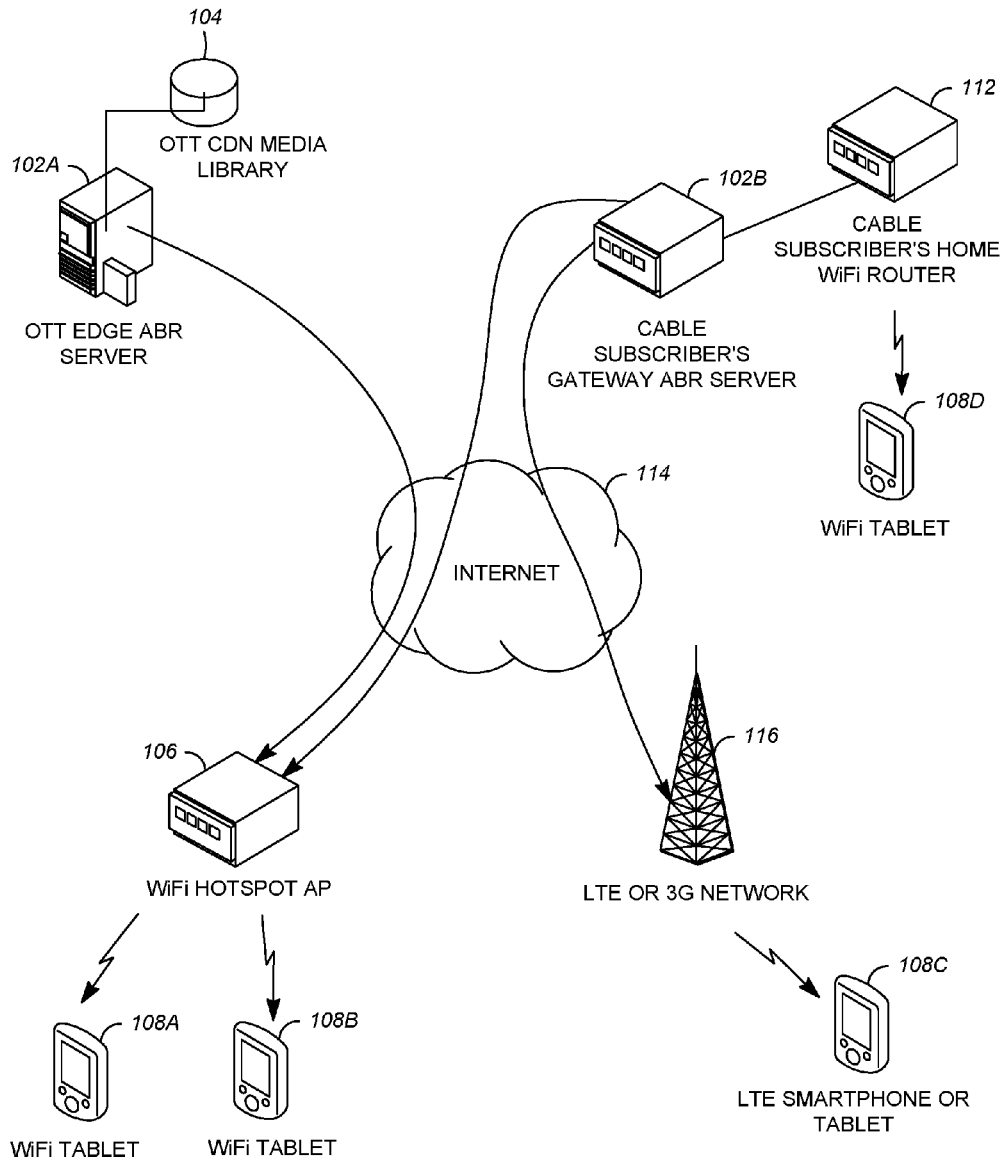
FIG. 1 is a diagram illustrating an exemplary architecture for server-side adaptive bit rate (ABR) control of a media streaming session.

FIG. 1 is a diagram illustrating an exemplary architecture 100 for server-side adaptive bit rate (ABR) control of a media streaming session. In the illustrated embodiment, the architecture 100 comprises an ABR server 102A that can be implemented in edge servers for over-the-top (OTT) delivery of cached media streams contained, for example, at content distribution network (CDN) storage servers 104. In one embodiment, the OTT edge ABR server 102 operates on mezzanine content which is media prepared at high quality and high bit rate which might not be suitable for delivery over bandwidth (BW) constrained networks. The ABR server may also be embodied by a consumer's gateway (GW) device 102B connected in their home to a cable, telco, satellite or other Internet protocol (IP) multiple-system operator (MSO) network operating on content processed. This subscriber gateway device 102B could have hard-disk drive (HDD) storage and/or digital video recorder (DVR) capability to receive, store, and retrieve content delivered over the MSO network for playback. The consumers GW device 102B would also provide ABR transcoding control for live tuned streams received from the MSO network. Hereinafter, the OTT Edge ABR server and customer's GW ABR server may alternately be referred collectively as ABR server(s) 102.

In both of these example server-side embodiments, the ABR server 102 provides the media streams to wireless or wired clients 108A-108D (alternatively collectively referred to hereinafter as clients(s) 108) over bandwidth constrained IP networks such as the Internet 114. The media streams are transcoded or transrated by the ABR server 102 to fit the network bandwidth available to the client 108. The ABR server 102 measures this bandwidth as the clients 108 request and download media data or segments using HTTP. The clients 108 may be in the user or subscriber's home and retrieve content over the home WiFi network implemented by WiFi router 112 from the subscriber's cable gateway ABR server 102B or they may be remote and retrieve the content through the Internet via a WiFi hotspot 106 or LTE/3G cellular network 116 from the home gateway 102B or OTT ABR edge server 102A. The transcoded media files may be segmented and formatted for delivery using any standard HTTP streaming segmented file format including, but not limited to, Apple HTTP Live Streaming (HLS), Microsoft Smooth Streaming (MSS), MPEG Dynamic Adaptive Streaming over HTTP (DASH), and Adobe HTTP Dynamic Streaming (HDS).

Importantly, the methods and systems described below differ from conventional adaptive bit rate schemes and standards currently in use to deliver media over IP. Protocols and standards such as DASH, HLS, MSS or HDS typically implement adaptation on the client side by requiring the streaming client to measure it's available received network bandwidth and choose a media stream of appropriate bit rate from a master playlist or manifest file containing multiple bit rate options (in HLS terminology a media playlist contains a list of uniform resource identifiers (URIs) that are addresses to media segments while a master playlist contains URIs that are addresses to media playlists). This often requires a storage network 104 or gateway 102B to create and maintain, in advance of the request for the media program many bit rate variants of a media asset. This can be a cost/complexity burden for low cost consumer gateway devices that may have only one, or a few, transcoder engine(s) that must be shared among multiple streaming clients. The systems and methods described below removes some or all of the control and bit-rate decision-making from the client-side and positions it on the server-side for just-in-time (JIT) creation of media streams that fit the available bandwidth to individual client devices. Only one transcoder instance is needed per client and, as well, server-side storage of multiple variants of a given media asset are replaced with the need for storing only one variant from which to make all JIT adaptive streams.

Figure 2:
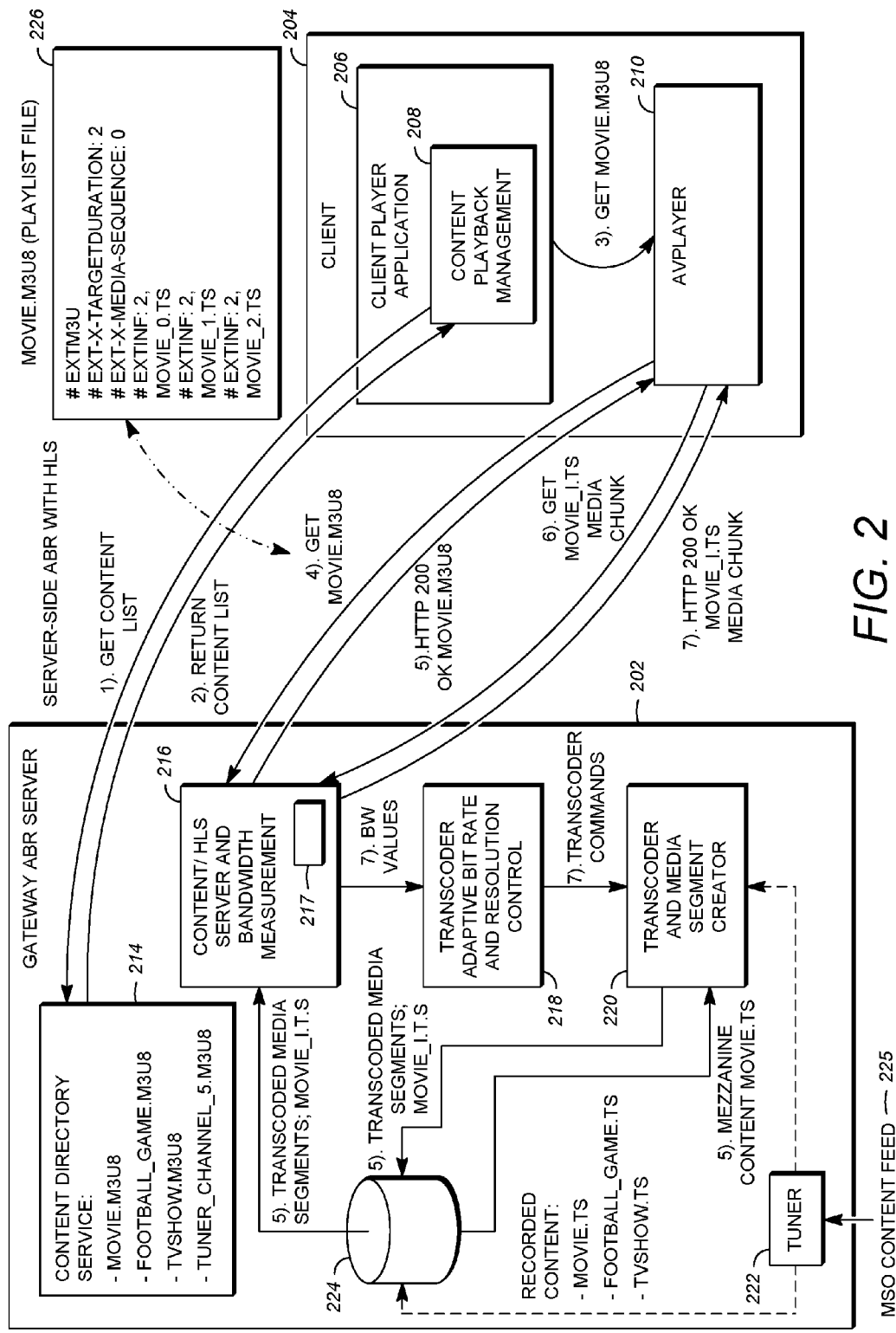
FIG. 2 is a diagram of an exemplary implementation of data streaming system comprising an ABR server and client system.

FIG. 2 is a diagram of an exemplary implementation of data streaming system 100 comprising an ABR server 202 and client system 204. This exemplary implementation is oriented to the HLS protocol (HLS compatible commands and messages are illustrated), however, the architecture and substantive information content in the commands and messages can also be applied to other protocols, such as DASH, MSS, or HDS.

In the illustrated embodiment, the ABR server 202 comprises a content server 216 that includes a bandwidth measurement module 217, transcoder rate/resolution controller 218, media transcoder and media segment creator 220, and one or more content sources (such as tuner 222 or DVR).

For the illustrated embodiment employing the HLS protocol, the client 204 may be an IPAD or IPHONE running the APPLE IOS AVPLAYER, called by an application, that retrieves and plays content from the ABR server 202. The ABR server 202 is connected to the MSO content feed 225 in which a tuner 222 can be commanded to tune to a desired media channel of the MSO content feed 225. The tuner 222 may be a satellite or cable tuner, or in the case of a telephone company (telco) provider, a device that supports IP multicast join functionality. The content received by the tuner 222 may be transcoded live or recorded to a recording device such as a DVR for later transcoding. The content may also be transcoded and then stored on the recording device. The ABR server 202 and client interact as illustrated in FIG. 2 to provide ABR delivery of data streams.

In step 1, a content playback management module 208 of a client player application 206 executing on the client 204 transmits a request for a content list to a content delivery service of the ABR server 202. The content list may include (as illustrated) a movie, a football game, a TV show, or a channel of the MSO content feed, for example, channel 5). In one embodiment, the client 204 retrieves the list of available content from the ABR server 202 using an HTTP "GET" command/function to retrieve a channel map or recorded content directory.

In step 2, the client directory service 214 of the ABR server 202 sends the client 204 the content list. The client 204 receives the content list, and the content playback management module 208 of the client player application 206 processes and formats the information in the content list for presentation to the user of the client device 204. Using the client device 204, the user selects one of the media assets in the content list. Each of the media assets are uniquely associated with a playlist needed for playback. In the example described further below, the user has selected a movie media asset that is associated with the playlist stored with the filename "Movie.m3u8".

In step 3, the client player application 206 instantiates an AVPLayer 210 object with the Movie.m3u8 asset as a target for playback. The AVPlayer 210 is an object defined in the APPLE iOS that can be used to implement controllers and user interface for playing back single or multiple items.

In step 4, the AVPlayer 210 transmits a request for the selected data asset to the ABR server 202. In one embodiment, this is implemented by transmitting a request for a manifest or playlist associated with the media asset selected by the user (in this case, "Movie.m3u8") to the ABR server 202. As shown in FIG. 2, this can be achieved by use of an HTTP "GET" command/function.

In response to receiving the request for the media asset, shown in step four, the ABR server 202 responds by (1) generating transcoded segments of the media asset and a manifest for these transmitted segments and (2) sets up a network TCP layer filter on the traffic to and from the server IP address and port to and from the client 204 for purposes of estimating transmission bandwidth between the ABR server 202 and the client 204.

With respect item (1), the ABR server 202 retrieves a mezzanine recording of the selected media asset (in this case, for example, an MPEG-2 transport "Movie.ts" file signaled by the "Movie.m3u8" playlist or manifest request). The media asset may be received from the MSO content feed 225 through the tuner 222 or retrieved from a storage device 224 accessible to the ABR server 202, such as a hard disk drive (HDD) of a DVR. After retrieving the media asset, the ABR server 202 begins a transcode session on the transcoder and media segment generator (hereinafter, transcoder 220) to transcode the mezzanine recording of the media asset into a version suitable for transmission to the client 204.

In one embodiment, the transcoder 200 is initially configured to produce a low bit rate and resolution, e.g., 500 kbps at 384×216 (horizontal×vertical pixel) resolution, given that the channel bandwidth characteristics to the client are not yet known. Alternatively, the transcoder may reuse settings from a prior session with the same client 204 or any client for which the transmission channel is expected to have similar.

The transcoder transcodes and temporally segments the selected media asset retrieved from the storage device 224 into a plurality of small files. For example, each file may represent a portion of the movie two seconds in length, with each file being separately named and stored as "Movie_i.ts" with i=1, 2, . . . n.

A low initial bit rate should assure that the first media segment produced by the transcoder 220 downloads to the client within the duration of the media segment itself (in this case, two seconds). As further shown in step 5, the resulting transcoded segments are stored in a local memory such as the storage device 224. A uniform resource identifier (URI) is generated for each segment or "chunk," and the URIs written into an HLS manifest or playlist file 226 ("Movie.m3u8" as illustrated in FIG. 2) that is returned to the client 204.

The manifest file 226 is of the sliding-window type in which three segments, for example, are advertised with the earliest segment removed from the playlist 226 when a new one is completed and added to the playlist 226.

With regard to item (2), the ABR server 202 sets up a network TCP layer filter on the traffic to and from the server IP address and port to and from the client 204. This filter provides a callback to the Bandwidth (BW) Measurement function when certain traffic is detected on the Gateway server's IP network interface as described further below.

As shown in step 6, the AVPlayer 210 of the client 204 requests the available media chunks or segments listed in the playlist one after the other, in the temporal order indicated by the playlist 226. As shown in step 7, the HLS server 216 retrieves the requested media chunks from storage 224 and transmits them to the client 204.

New segments or chunks may be downloaded as they are created and advertised in a new or updated playlist 226 that are transmitted from the ABR server 202 to the client 204. A new manifest or playlist may be transmitted each time a newly transcoded chunk is available, or less frequently, depending on the how many segments are represented by the manifest or playlist 226, and how often the transcoding parameters used for a segment or chunk of the media asset change because of channel bandwidth.

While each media chunk is delivered to the client 204 from the ABR server 202 using TCP over IP, the bandwidth measurement function on the ABR server 202 uses the TCP acknowledge messages (ACKs), detected by the TCP filter set up by item (2) above, from the client 204 to determine the number of bytes sent over the channel within a time interval. This allows calculation of network throughput (or goodput) between the ABR server 202 and the client 204. The ACK data are reported from the BW measurement module 217 by the TCP layer filter callback described in step 5 above to the transcoder adaptive bitrate and resolution control module 218. The transcoder adaptive bitrate and resolution control module 218 makes dynamic changes to the video transcoder bit rate and/or resolution commands based on the conditioned or filtered bandwidth measurements it receives from the BW measurement module 217.

In one embodiment, filtering of the bandwidth measurement is performed to reject spurious bandwidth measurement values. Typically, such filtering must be performed with low latency if responsive control of bitrate is desired. For example, if filtered BW values drop suddenly from temporally previous values (indicating, for example, network congestion or PHY layer packet loss due to channel errors), the transcoder bit rate will be reduced. If the filtered bandwidth estimates drop below a defined threshold, the ABR server 202 may be commanded to deliver just the audio component of the media asset which (which typically requires only a 64 kbps maximum bit rate). If subsequently estimated BW values increase and remain above another threshold for a sufficient period of time or number of chunks, the adaptive bit rate and resolution controller 218 may command the transcoder and media segment creator 200 to transcode the segments at an increased bit rate that can be gradually further increased in temporally subsequent segments until the estimated BW measurements approach or exceed an upper threshold where it might be capped, if desired.

Steps 6 and 7 are iterated repeatedly as the transcoded and chunked media segments are requested by, and delivered to, the client 204. Further, an updated playlist file 226 is generated as needed, and transmitted to the client 204.

Bandwidth Measurement

Measurement of the network available bandwidth measurement can be performed at the TCP layer using the TCP ACK messages or HTTP layer, as described below.

Bandwidth Measurement at TCP Layer

Measurement of the media segment (or chunk) download bit rate can be achieved using properties of the TCP interaction between ABS server 202 and client 204 during the retrieval of the media segments using the HTTP GET commands. In TCP, fragments of data are sent from server to the client and the client acknowledges (ACKs) receipt of those fragments to the server by reporting the number of bytes of data it has successfully received. These ACK messages are sent at intervals based on TCP's algorithms for slow start and congestion control but generally serve to allow data to flow between server 202 and client 204 at rates up to the available bandwidth of the network 114. In one measurement implementation, the ACK messages from the client 204 are detected and locally time stamped by the ABR server 202. Then, the bandwidth or throughput (e.g. bytes/second) of the channel being used to transmit the data can be determined as the difference in byte-values acknowledged between two temporally successive ACK messages received at different times divided by their time difference. An alternate means to estimate bandwidth is to monitor the number of bytes entering the ABS server TCP buffer over units of time.

Using TCP Traffic Filters for Throughput Measurement

Figure 3:
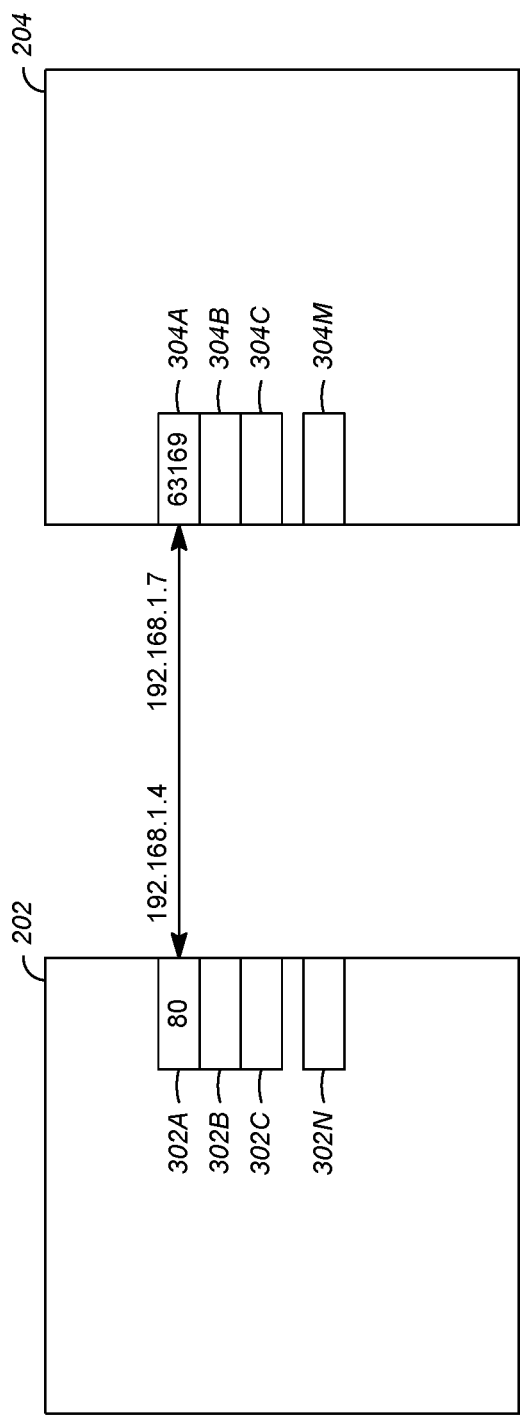
FIG. 3 is a diagram illustrating the communications between the ABR server and the client.

FIGS. 3 and 4 are diagrams illustrating now TCP traffic filters can be used by the bandwidth measurement module 217 to measure data throughput.

FIG. 3 is a diagram illustrating the communications between the ABR server 202 and the client 204. In the illustrated example, the ABR server 202 includes a network interface (for example, and Ethernet interface) that has includes a plurality of definable ports 302A-302N. Likewise, the client device 204 has an associated network interface having a plurality of definable ports 304A-304M. TCP/IP communications between the ABR server 202 and the client 204 are established by IP address and port number. In the illustration of FIG. 3, communications between the ABR server 203 and the client 204 are implemented on the ABR server's IP address of 192.168.1.4:80 and the client device IP address of 192.168.1.7: 63169.

In the ABR server 202, a portable C/C++ library for network traffic capture (libpcap) is utilized to set up and monitor traffic filters on the server's network interface. When the client 204 makes an HTTP GET request to the ABR server 202 for a media segment such as "Movie_0.ts", the message is parsed to identify the appropriate bytes of the TCP/IP header to determine the requesting client's IP address and port. The libpcap filter then internally time stamps the reception of the HTTP GET request. The network packet data and are then reported to the bandwidth measurement module 217 through a callback function. Taken together, this data represents a TCP flowgraph.

FIG. 4 is a diagram illustrating an example of how a typical bandwidth measurement can be derived from a TCP flowgraph of a chunk download. In this example, a libpcap filter has been created to monitor or filter all packets ingressing and egressing on port 80 of the ABR server 202.

As shown in the first entry, the ABR server 202 at IP:port address 192.168.1.7:80 receives a request for a media asset segment ("GET chunk_000001.ts") on an open TCP socket from a client 204 at IP:port address 192.168.1.4:63169. The time of request, along with the address it came from, is logged by the libpcap filter. Since this is a request for a media segment, it is deemed to be received at time to =0.000000 seconds without loss of generality.

The ABR server 202 responds by sending the requested media segment or chunk file (chunk_0000001.ts). The media segment is sent in groups of TCP fragments, each up to 1448-bytes in size (the Maximum Segment Size (MSS) of the Ethernet layer), and many of which may be transmitted by the ABS server 202 and received by the client 204 before the client 204 acknowledges receipt of the first transmitted group. Each transmitted TCP fragment is logged by the libpcap filter, including a time stamp of when the fragment was transmitted, the IP address and port of the source of the fragment, a sequence number to associate the entry with the TCP fragment and an acknowledge number associated with the media segment or chunk file.

In the example illustrated in FIG. 4, the first TCP fragment transmits 1448 bytes, and is logged as being transmitted at time $t_1$=0.000828, and is assigned sequence number 435 and acknowledge number 597. The next TCP fragment also transmits 1448 bytes, is logged as being transmitted at time $t_2$=0.000839, and is assigned a sequence number of 1883 (435+1448), and an acknowledge number of 597 which is a further repeated acknowledgement of the bytes sent by the client to the server in the initial manifest GET request.

Several additional TCP fragments are transmitted before the ABR server 204 receives an acknowledgement (ACK) about any of the TCP fragments it has previously sent from the client 204. This first ACK is received at a libpcap timestamp of $t_0$=0.005664.

This ACK (denoted $ACK_0$) is acknowledging that $R_0$=3331 bytes were received by the client 204. The bandwidth measurement module 217 receives and stores callbacks for subsequent ACK messages. That stored information is then used to compute an estimate of the bandwidth of the communications channel being used to send the media segment or chunk. Computing the bandwidth estimate from each ACK message when received may provide bursty results that are highly variant, so the estimate may be computed over longer periods of time. For example, in one embodiment, the bandwidth measurement module 217 collects and stores callbacks for a defined sampling interval $T_{sam}$ and then makes the bandwidth calculation using the temporally next ACK message ($ACK_i$) received by the ABR server 202. In the example shown in FIG. 4, the sampling interval $T_{sam}$ is 100 msec, but other values may be used. Further, the sampling interval $T_{sam}$ may be preset and remain constant at a particular value, or varied according to callback data. It may also be varied according to the complexity of the media segments being transmitter, using data obtained from the transcoder 220.

Turning again to the example shown in FIG. 4, the $ACK_1$ at timestamp $t_1$=0.126924 sec satisfies T=$t_1$-$t_0$=(0.126924−0.005664)=0.12126 sec. The ACK received at $t_1$ acknowledges $R_1$=143221 received bytes. The number of bytes received at the previous sample point to =0.005664 is 3331 bytes. The final bandwidth calculation for this sample interval may be given by Equation (1) below:

$$BW_n=(R_{n+1}-R_n)*(8\text{ bits/byte})/(t_{n+1}-t_n) \quad \text{Equation (1)}$$

Or in this case, $BW_0$=($R_1$-$R_0$)*(8 bits/byte)/($t_1$-$t_0$)= (143221−3331)*8/0.12126=9.229 Mbps. The sampling interval $T_{sam}$ may be constant or varied, and may be predetermined or determined from other parameters.

Reducing BW Measurement Variance Through Smoothing Filters

It is noted that by reducing the sampling interval for measurements, $T_{sam}$, the measurements come more frequently in a chunk download allowing for rapid detection and response of bandwidth changes. Further, it is typical for temporal duration of the media asset segments (HLS chunks) to be no more than one to two seconds, to allow for fast startup in stream playback at a client (since the transcoded stream can be delivered in chunk segments only after the chunks have been created by the transcoder).

Using sampling intervals of $T_{sam}$=100 or 250 msec can result in multiple bandwidth measurements per 1 to 2 second long chunk download if the available bandwidth of the network is near equal to the chunk's transcoded media bit rate. Multiple bandwidth measurements received during a current chunk download allows for control of the transcoded bitrate/resolution during the creation of the next chunk to be downloaded facilitating the faster response noted above. In other words, if chunk N is being delivered while chunk N+1 is being transcoded and a network bandwidth drop can be detected in the first few hundred milliseconds of chunk N download, the transcoder bit rate and/or resolution of chunk N+1 can be changed during its creation to better match the network bandwidth currently being experienced. This allows for more reliable download of chunk N+1 than if it had been created at a bit rate too large to be transmitted over the available bandwidth in the chunk time.

However, lowering the sampling interval (or decreasing the sampling time $T_{sam}$) also results in greater measurement variation as TCP goes through slow start and congestion control algorithms.

To reduce the latency of the measurements provided, yet reduce measurement/estimation variation, one embodiment of the BW measurement module 217 includes a filter for filtering the bandwidth measurements before they are supplied to the transcoder and adaptive bit rate resolution controller 218.

Appropriate filters include sliding n-tap median (e.g. 3 or 5 tap median filter), sliding-window average such as the p-term moving average:

$$FBW_n=\Sigma_{i=n-p}^{n}BW_i \quad \text{Equation (2)}$$

wherein:
$FBW_n$=Filtered Bandwidth Measurement n
$BW_i$=Unfiltered Bandwidth Measurement i p=number of terms used in the moving average filter or single-pole or exponential filter of type:

$$FBW_{n+1} = \alpha BW_n + (1-\alpha) FBW_n \qquad \text{Equation (3)}$$

where $FBW_n$ denotes the filtered bandwidth at measurement n and a is a filter gain.

Figure 5:
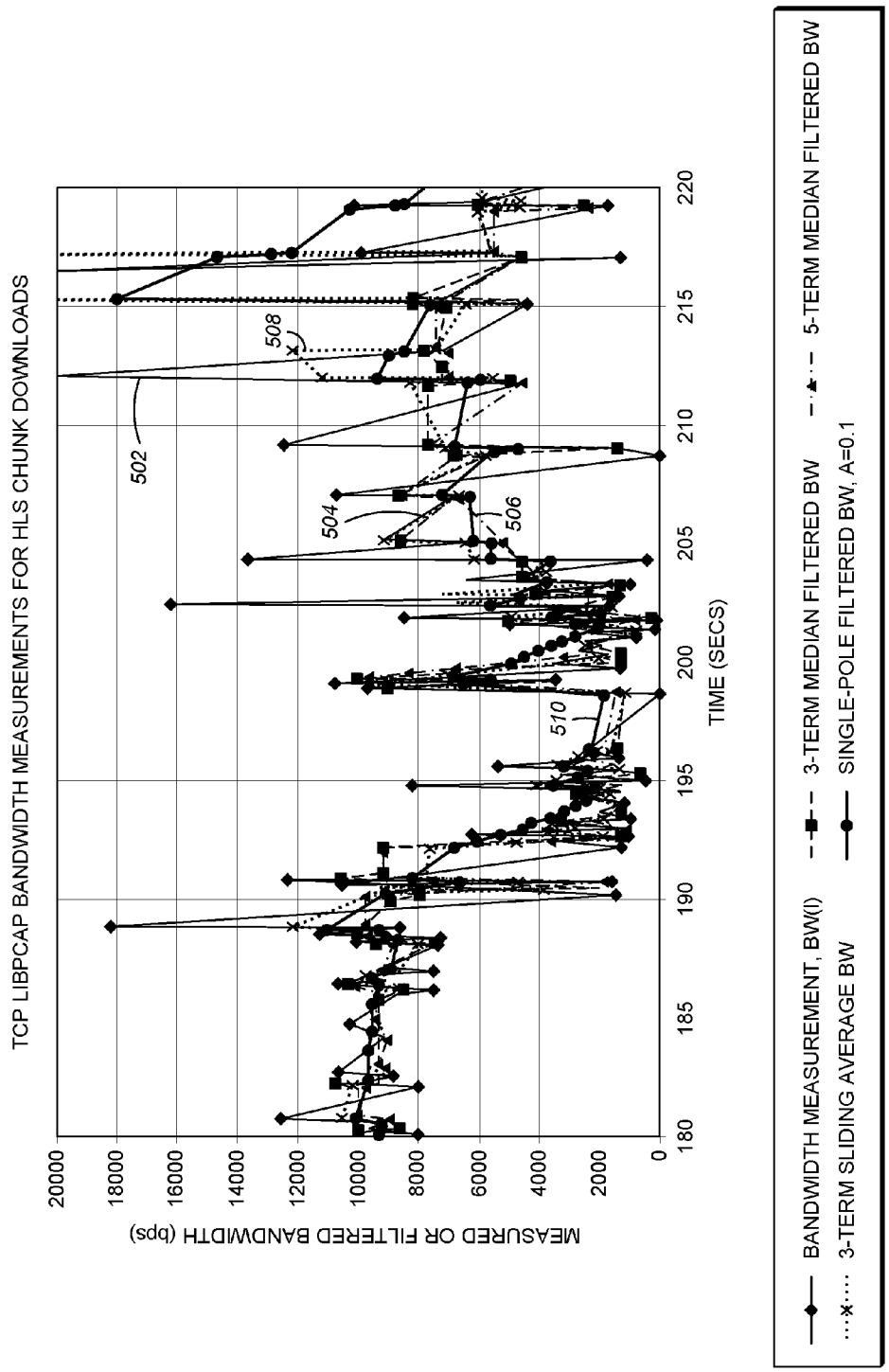
FIG. 5 shows a comparison of measured results for different bandwidth smoothing filters made while the bandwidth of network was dynamically controlled using a managed switch to force varying rate limits.

FIG. 5 shows a comparison of measured results for different bandwidth smoothing filters made while the bandwidth of network was dynamically controlled using a managed switch to force varying rate limits. In all cases, the network throughput was limited to 10 Mbps from 180 to 190 seconds then changed to 2 Mbps until 200 seconds, and raised back again to 8 Mbps. The measurement sampling interval was $T_{sam}$=100 msec.

It can be seen that the libpcap bandwidth measurements (computed every 100 msec, denoted BW(i) and indicated by plot 502) varied substantially. The 3 and 5-term median filters (denoted by plots 504 and 506, respectively) provide good reaction to outlying (large or small) spurious measurements while being very temporally responsive. The 3-term sliding average (denoted by plot 508) is also fairly responsive but can be seen to have much larger excursions in reaction to large spurious measurements than the 5-term sliding average filter. Finally, the low bandwidth single-pole filter having a=0.1 (denoted by plot 510) is seen to be much slower to respond to changes in bandwidth but does produce a filtered value having low variation. Using a higher bandwidth filter such as a=0.9 would make for faster response but much greater variation.

End-of-Chunk Handing

As illustrated in FIG. 5, the instantaneous $BW_i$ measurements at sample time i are seen to sporadically exhibit large values. Some of these variations can be attributed to characteristics of the TCP flow itself near the end of the chunk download.

In TCP, data is typically transmitted in units known as maximum transmission units (MTUs) or Maximum Segment Size (MSS), typically 1448 bytes, as in the example shown in FIG. 4. Also, the receiver (client) TCP socket identified by the IP address and port number gathers data received from the sender into a receive socket buffer and as the client application pulls data from this socket buffer, the TCP receive "window" of available space in the buffer increases and is advertised in the ACK message transmitted back to the sender. As a consequence, there can typically be many maximum transmission unit (MTU) sized fragments of data remaining in this receive socket buffer but yet unacknowledged. This is also apparent from examination of FIG. 4.

As the sender delivers the last remaining fragments of the media chunk over the network, the receiver application, upon their reception, will eventually empty the socket buffer and reply to the TCP sender with a volley of ACKs signaling reception of all of remaining chunk bytes.

It has been observed that if the $T_{sam}$ sampling interval callback from libpcap for a $BW_i$ measurement occurs during this final volley of ACKs, then the subsequent $BW_{i+1}$ measurement will could have a very short T measurement of a few kilobytes of data and result in an extremely large spurious measurement.

In one embodiment, this problem is remedied by subsuming this last short time duration measurement into the previous measurement. That the last short time duration measurement belongs to the previous measurement is detectable since the server ABR measurement module knows the content size of each chunk that was delivered to the client and can detect that the last volley of ACKs represents the last bytes of the chunk download. Making this small correction to the measurement algorithm eliminates many of the large excursions in $BW_i$ seen in FIG. 5.

TCP SACK Issues

TCP also supports the notion of "selective acknowledgement" as defined in Internet Engineering Task Force request for comment (IETF rfc) 2018, which is hereby incorporated herein by reference.

Multiple packet losses from a window of data can have a catastrophic effect on TCP throughput. TCP uses a cumulative acknowledgment scheme in which received segments that are not at the left edge of the receive window are not acknowledged. For example, if the transmitted packets are 1 2 3 4 5 6 7 8 9 10 and packet 4 is lost, the receiver is presented with 1 2 3 X 5 6 7 8 9 10. But when the receiver fails to receive packet 4 (a hole), it transmits an ACK message to the sender indicating that packet 4 is missing, even while packets 5-10 are received. As a result, packets 5-10 may not be properly received. This forces the sender to either wait a roundtrip time for each packet to find out about each lost packet, or to unnecessarily retransmit segments which have been correctly received. With the cumulative acknowledgment scheme, multiple dropped segments generally cause TCP to lose its ACK-based clock, reducing overall throughput.

Selective Acknowledgment (SACK) is a strategy which corrects this behavior in the face of multiple dropped segments. With selective acknowledgments, the data receiver can inform the sender about all segments that have arrived successfully, so the sender need retransmit only the segments that have actually been lost (in the above example, packet 4).

With SACKs, the client may respond with ACKs that have TCP SACK options fields in the TCP header that indicate groups of contiguous bytes of data that have been received successfully. Consequently, there may be "holes" in the received byte stream that the server-side sender eventually fills in with TCP retransmissions of the missing segments. Non-contiguous blocks of received data are signaled by left-edge and right-edge byte ACK values (e.g. the beginning and ending bytes of the block of data received). Methods for incorporating SACK operation into the bandwidth measurement algorithm include (1) disregarding the holes in the received data stream and simply use the right-edge of the last block ACK'd in the options field as $R_1$ in Equation (1) (e.g. simply disregarding the SACK messages) or (2) subtract the number of bytes signaled as not received by a SACK message in the options field from the $R_1-R_0$ value of Equation (1) where $R_1$ is the right-edge of the last block signaled.

Implementation of TCP-based Bandwidth Measurement

Implementation of the TCP-based available bandwidth measurement makes use of certain characteristics of the download of segmented media over HTTP. Using Apple HLS as an example, the client player will request a manifest file for the desired media asset, e.g., Movie.m3u8, that lists media file segment or chunk URIs that the player will subsequently request (HTTP GET) from the server to decode and render. In some implementations, each GET by the player of a Movie.m3u8 manifest is done on a separate TCP socket connection, i.e., the iOS AVPlayer closes the socket after each Movie.m3u8 GET (TCP CLOSE at the network layer). Conversely, the AVPlayer may make multiple contiguous chunk downloads on the same TCP socket connection (8 is a typically observed value) before closing a particular socket, given the server implementation does not force a close before that time. Recall that there may be multiple simultaneous media transcoding/streaming sessions occurring through one ABR server to separate remote clients all being served through the same server IP address and port. Note also that TCP socket connections can be uniquely identified by the client's IP address and IP port value; ports are randomly created by the client TCP stack for each new socket session it creates.

The above observations lead to an implementation of the TCP bandwidth measurement algorithm using efficient and understandable data objects or structures. The measurement algorithm creates data structures or objects for the TCP sockets, individual chunk downloads, and individual $T_{sam}$ quantized bandwidth measurements; these will be denoted respectively as Streams, Flows, and Buckets in the following description leading to the implementation of equation (1):

The individual streaming sessions can be identified by a SessionID which is bound to the requested media asset and subsequent GW ABR transcoder instance. For example, if the GW has four transcoders, then SessionID might take values from 1 to 4. So if a remote client 204 requesting a media asset "Movie.m3u8" playback was assigned transcoder 3 (since it was the next available transcoder resource in the ABR server 202), then SessionID might be assigned as 3.

Manifest file 226 names and chunk file URI values can contain text strings or other identifiers that uniquely bind the asset to the SessionID at session initiation, e.g., Movie.m3u8 might contain URIs with filenames such as:

Chunk_XAvQrt155 0000000000.ts
Chunk_XAvQrt155 0000000001.ts
Chunk_XAvQrt155 0000000002.ts, etc.

where the randomly assigned string "XAvQrt155" is associated to transcoder 3 and SessionID=3 at session startup.

The TCP filter set up for libpcap can invoke a callback routine that reports the TCP packet contents and locally created timestamp of packet arrival for any traffic ingressing or egressing on the ABR server port 302, for example, port 80. By inspecting a range of bytes in the packet payload, the callback function can discriminate the chunk and manifest downloads. If the callback function finds the text strings "GET" and ".m3u8" in a packet payload, then the callback function can determine that a manifest download request by the client 204 has been received. If the callback function finds the text strings "GET" and "Chunk_XAvQrt155" in the packet contents, then the callback function can determine that a chunk download request has been received (other such identifiers may be used to discriminate the chunks and manifests per session as well). Since it is desired to measure the bandwidth to the client 204 during chunk downloads, the latter callback will invoke the following steps in the measurement routine:

Step A: Retrieve the client IP address and port number from the TCP packet contents containing the chunk GET command and check if a Stream (TCP socket) exists for this address/port pair. If not, then a new Stream is created identified by the client IP address and port number.

Step B: Create a new Flow for the Stream just identified or created. The Flow will hold measurements for that particular chunk download.

Step C: Whenever a libpcap callback is made for the given Stream->Flow from the client 204 (identified by inspection of the client IP address/port pair which are unique and bound to SessionID and TCP socket), the callback function inspects the TCP header for the presence of a TCP ACK, and if found, creates a new Bucket for this Flow if one does not already exist, and records the first ACK value packet time stamp as to and ACK'd byte value as $R_0$ in the corresponding Bucket. If this is the first Bucket of the Flow, then a value $R_{init}=R_0$ is also initialized to be used as the start byte number of the chunk download. Subsequent callbacks for this Stream->Flow->Bucket that contain ACKs from the same client 204 have their timestamps recorded as $t_1$ and ACK'd byte value as $R_1$. The value $Dt=t_1-t_0$ is calculated on each such Bucket update and when Dt just equals or exceeds the $T_{sam}$ sampling interval (e.g., 100 or 250 msec), a measurement for that Bucket may be made using equation (1). This measurement is then sent to the bandwidth filtering algorithm(s) described above with the SessionID binding associated with the Stream->Bucket->Flow from which it came.

Step D: In step C, the libpcap callback detects whether the last $R_1$ value of acknowledged bytes minus $R_{init}$ equals the downloaded chunk content length (available either by parsing the TCP response to the original chunk HTTP "GET" request for the text "Content-Length: content-size-in-bytes" or by querying the ABR server 202 file system for the downloaded chunk's size).

If $R_1-R_{init}$ equaled the chunk size in bytes, then the client 204 has received and acknowledged the total chunk download. The Bucket and corresponding Flow may be destroyed at this time as part of cleanup or delayed until the TCP socket is closed by detection of a libpcap callback with appropriate TCP socket closed signals (FIN messages from client 204 and/or server 202). The end of chunk download issue described above can be handled here by comparing $R_1-R_{init}$ to the content length; if they are close in value, then the Bucket can be left open and the subsequent time stamp from the last ACK of the chunk download can be used for the bandwidth calculation for the final Bucket.

Step E: In step C, if $R_1$ is less than the chunk size at the sampling interval, this implies that the client is still downloading the chunk and a new Bucket can be created in anticipation of further callbacks with client ACKs for the downloading TCP fragments. This new Bucket can be initialized such that it's $(t_0, R_0)$ values equal the final $(t_1, R_1)$ values of the previous Bucket.

Step F: Streams are mapped to open socket connections. When a socket closes, the Stream may also be destroyed as part of memory management.

Using the above nomenclature, if an iOS AVPlayer starts an HLS session with the ABR server 202 and assigned SessionID=3, and a single socket 302 is used for up to eight chunk downloads before the AVPlayer closes the socket, then by steps A-E, a Stream will be created bound to SessionID=3 and over the 8 chunk downloads, 8 Flows will have been created and each Flow will have contained potentially multiple Buckets depending on how many multiples of $T_{sam}$ seconds each chunk download entailed.

Bandwidth Measurement at HTTP Layer

In segmented HTTP media streaming systems, a media segment consisting of MPEG-2 TS packets or an MP4 file fragment, is retrieved from the ABR server 202 by a client 204 using the HTTP GET command. The ABR server 202 can make a bandwidth measurement at the HTTP layer by measuring the time, to, when the media fragment bytes are delivered to the server's socket send buffer and the later time, $t_f$, when the buffer has emptied which signifies that the total media segment has been delivered and ACK'd by the receive client side. Then given the known media fragment file size, a bandwidth estimate can be calculated similar to equation (1). This action does not require tight continuous polling by the server measurement algorithm of the send buffer fullness. The algorithm need only start the timer and record to when the first byte of the media segment is delivered to the socket send buffer, and then when the last byte is delivered, the server measurement algorithm can poll the socket send buffer size until it is empty at which time $t_f$ is recorded.

The media segment-size based measurement method provides measurements only after the whole segment has completed downloading which for example might be only every 2 seconds if the media segment duration is 2 seconds and the media bit rate is equal to the available network bandwidth to the client. If more frequent measurements are desired in order to make transcoder bit rate and resolution changes that are responsive to the instantaneous network bandwidth, the measurement algorithm could, after writing a set of bytes, periodically poll the socket send buffer size at intermediate times, $t_i$, and make intermediate calculations between subsequent intervals similarly using equation (1). The nonzero socket send buffer size values (unsent bytes) will reflect TCP fragments that have not been sent or buffered for retransmission as their receipt has not yet been acknowledged by the client. These HTTP-based bandwidth measurements can be smoothed or filtered, if needed to reduce variability, as described above.

Bit Rate and Resolution Control

Video, Audio, and HLS Constraints and Considerations

Once the network BW measurements are obtained, there remains the problem of determining the optimal transcoding parameters to be selected, and commanding the transcoder and media segment creator 200 to transcode the mezzanine recordings according to those parameters. This function is performed by the transcoder ABR and resolution controller 218.

In determining the transcoder commands, it is essential to consider the transcoded media and stream formats. For HLS and other mobile applications, AVC/H.264 video compression algorithms may be employed and input mezzanine video coded in MPEG-2 or AVC compression formats may be transcoded to AVC in progressive mode usually at 30 frames/sec (fps). In HLS streams, audio may be assumed to be input to the transcoder in AAC or AC-3 formats and transcoded to stereo HE-AACv1 or v2 at typically slightly less than 64 kbps bit rate.

Changes to the transcoder 220 resolution settings are made only on Instantaneous Decoder Refresh (IDR) slice boundaries. IDRs might typically be spaced 1 to 2 seconds apart in an HLS media stream.

In some HLS embodiments, the remote cellular clients such as client 108C must be offered the choice of a very low bit rate variant at a total bit rate of 64 kbps or less. Typically, this is an audio-only stream that is AAC-LC or HE-AAC transcoded and its total bit rate (including Packetized Elementary Stream (PES), MPEG-2 Transport Stream (TS), and Program Specific Information (PSI) composed of Program Association Table (PAT) and Program Map Table (PMT)) is less than 64 kbps. In a single-stream server-side application, it is necessary to dynamically alter the media chunks between this 64 kbps audio-only stream and the higher Audio/Video (A/V) stream rate as network bandwidth requires.

Total media transport stream bit rate should be less than the measured network bandwidth by some margin to increase the probability that HLS chunks download in sufficient time that the input buffer of the AVPlayer 210 at the client 204 does not underrun during playback. HLS players have been noted to begin playback with as little as 2 seconds of media data buffered, and this relatively small amount of buffered data means a server-side bit rate control algorithm needs to react very quickly to changes in the bandwidth of the communications channel of the network used to transmit the information.

Dynamic transcoder changes should be constrained in time. Making too frequent change commands to video bit rate can cause transcoder rate control issues and, as well, can result in rapidly changing video quality of experience to the end user. Similarly making frequent and/or large video resolution changes should be avoided if possible.

Bit Rate and Resolution Control Implementation

Figure 6:
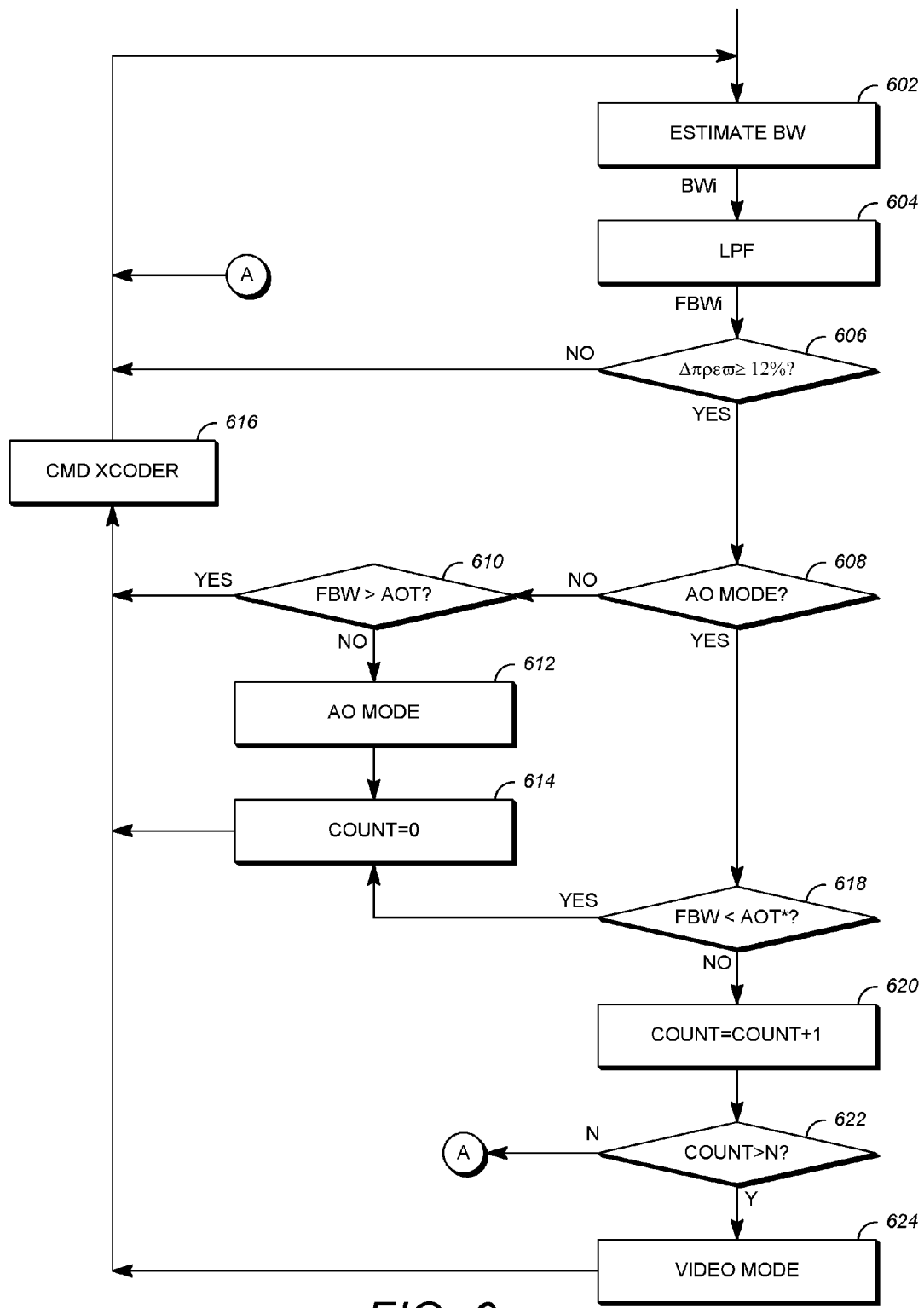
FIG. 6 is a diagram illustrating one implementation of a server-side ABR video bit rate and resolution control algorithm.

FIG. 6 is a diagram illustrating one implementation of a server-side ABR video bit rate and resolution control algorithm. For this implementation, the following mechanisms were utilized:

In block 602, a bandwidth estimate BWi is obtained using the techniques described above, with a sampling time $T_{sam}$ of 100 msec. In block 604, the resulting BWi estimates are applied to a filter such as a 3-tap median filter. The filtered bandwidth FBWi values subsequently are then applied to a +/−12.5% threshold applied, as shown in block 606. If the difference between the current filtered bandwidth FBWi value and the previous filtered bandwidth FBWi value does not exceed a selectable threshold amount (in the exemplary embodiment, 12.5%), processing uses the previous filtered bandwidth value from the last measurement to determine the bitrate and resolution change in the transcoder 220. This feature, which is illustrated in block 606, prevents small changes in bandwidth from driving unnecessary (from a standpoint of delivery rate or video quality improvement) transcoder bit rate changes.

Initialization of transcoder 220 state variables occurs may occur at the beginning of each transcoding session. Also, an algorithm is shown for detecting and managing the change to an audio-only state in which media chunks containing only audio media are delivered to the client 202 over low bandwidth networks.

Block 608 determines if the transcoder is in the audio only mode. If the transcoder is not already in the audio only mode, processing is passed to block 610 which determines whether the current filtered bandwidth value FBWi is greater than an audio only threshold (AOT). If so, the new filtered bandwidth value FBWi is used to command the transcoder, as shown in block 616, and processing is returned to block 602. If the new filtered bandwidth value FBWi is not greater than the AOT, processing is passed to block 612, which commands the transcoder 220 into the audio only mode, and initializes a counter, which is described further below.

Returning to block 608, if the transcoder 220 is in the audio only mode (e.g. by passing through blocks 612 and 614 as earlier described), it is determined if the filtered bandwidth FBWi is less than the AOT (or alternatively, the AOT plus an additional hysteresis value of perhaps 400 kbps, AOT*). If the filtered bandwidth FBWi has remained below the AOT (or AOT*), processing is routed to block 614, which resets the counter value and processing is then routed to block 602. If the filtered bandwidth FBWi rose above the AOT*, block 618 routes processing to block 620, which increments the counter. Processing is then passed to block 622, which determines if the counter has exceeded a threshold number of counts. If not, processing is returned to block 602. If the counter has exceeded a threshold number of counts, the filtered bandwidth estimate FBWi has exceeded AOT* a threshold number of times, and the transcoder 220 is commanded to transcode the data in the video mode using the latest filtered bandwidth estimate FBWi, as shown in block 624.

The foregoing implements a system wherein if the transcoder is in the audio-only state and the FBW measurements consistently exceed the AOT by some hysteresis value (e.g., the 400 kbps discussed above) a threshold number of times in a row, the transcoder 220 is permitted to enter the video state and use the new filtered bandwidth values FBWi. This prevents rapid changes between delivering audio-only and audio/video by requiring that the network bandwidth exceed the audio-only threshold for a programmable number of seconds or sample intervals. Switching too frequently from audio to A/V results in poor user quality of experience. Increasing bit rate commands to the transcoder may be limited to occurring only once every chunk interval to also lessen the variation in time of video quality and reduce the dynamic stress on the rate control in the transcoder hardware.

The CMD XCODER block 616 responds to increasing or decreasing filtered bandwidth measurements FBWi. When the network bandwidth is increasing the video bit rate is increased at a proportional rate of 10% (which can be selectable) to a maximum value that is some fraction of the network available bandwidth e.g. 40% or 60% of FBWi. This ensures that video quality does not rapidly transition from high-to-low and back during rapidly varying network bandwidth conditions. In this case, these geometrically increasing bit rate commands to the transcoder are limited to occurring only once every chunk interval to also lessen the variation in time of video quality and reduce the dynamic stress on the rate control in the transcoder hardware. Conversely, block 616 makes a rapid response to a drop in network bandwidth measurement FBWi; the video bit rate is commanded instantly to a fraction of the of the new low FBW measurement value, e.g., 40% or 60%. In both cases, a value for MPEG-TS PSI and audio bit rate is subtracted from the target TS bit rate to send as the command to the video transcoder as the desired video elementary stream bitrate.

Figure 7:
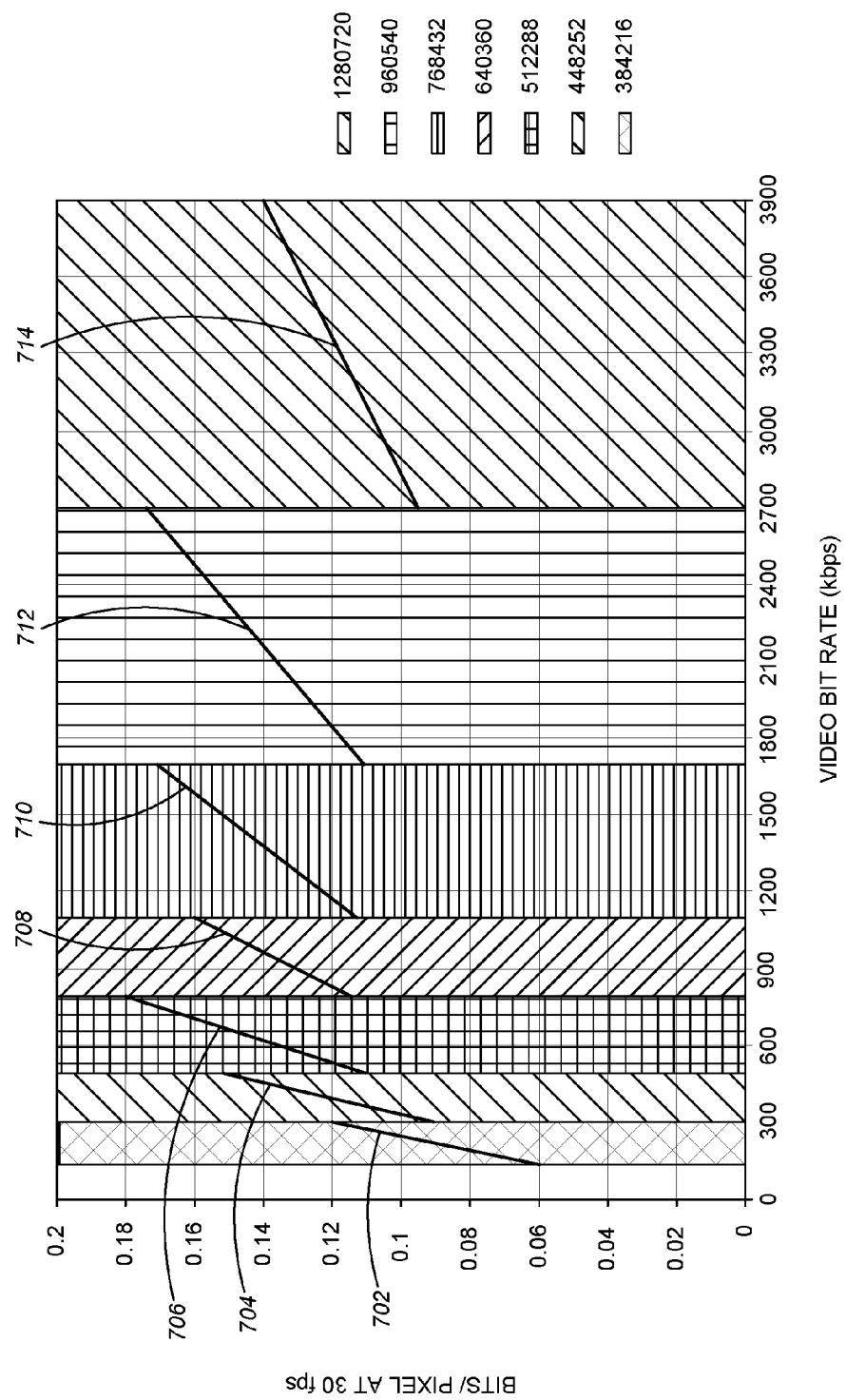
FIG. 7 is a diagram illustrating the coded video bits per pixel (CVBPS) for various 16:9 aspect ratio video resolutions versus video coded bit rate at 30 fps.

FIG. 7 is a diagram illustrating the coded video bits per pixel (CVBPS) for various 16:9 aspect ratio video resolutions versus video coded bit rate at 30 fps. For H.264/AVC encoding it is well known that 720p60 compressed sequences achieve good quality at a coded bit rate of about 6 Mbps and higher. Results are shown for 1280/720 (714), 960/540 (712), 768/432 (710), 640/360 (708), 512/288 (706), 448/252 (704), and 384/216 (702).

Applying a linear scaling for 30 fps implies that good 720p30 quality should be achievable at 3 Mbps. This represents CVBPS=(3 Mbps)/(1280×720 pixels/frame)/30 fps=0.11 coded-bits/pixel. Thus, for a given target video bit rate, it might be desired to choose a video resolution that maintains a CVBPS of around 0.11. FIG. 7 shows the video resolution values chosen for a given video bit rate command to the transcoder element. For example, if the algorithm determines the necessary video bit rate for network condition lies between 1700 kbps and 2700 kbps, the video resolution is set to qHD at 960×540 pixels but if the desired video bit rate is between 500 and 800 kbps, the resolution is set to 512×288.

Figure 8:
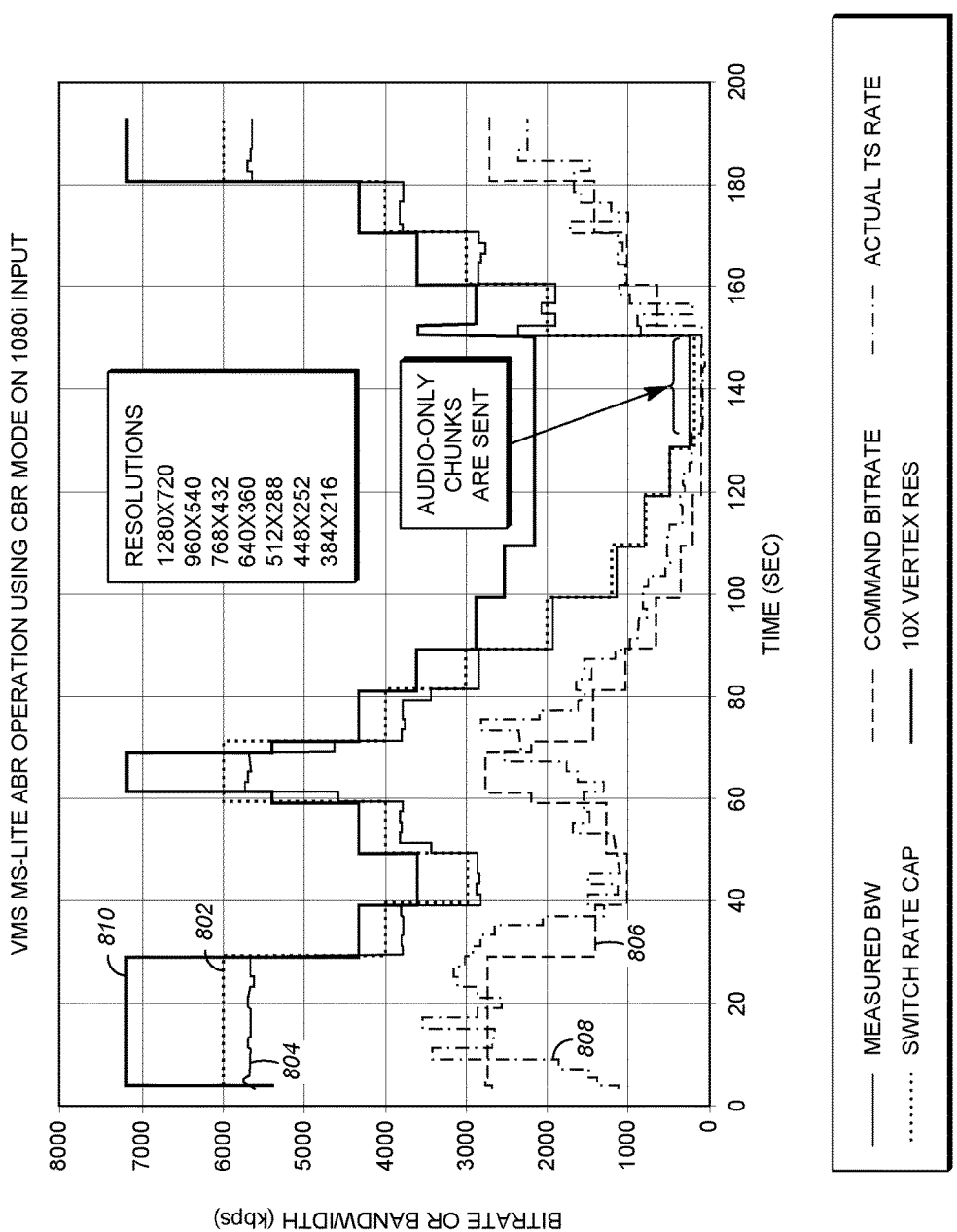
FIG. 8 is a diagram illustrating an example of the performance for one set of thresholds and parameters used in server-side ABR.

FIG. 8 is a diagram illustrating an example of the performance for one set of thresholds and parameters used in server-side ABR. A GW ABR server 202B Ethernet output was dynamically throttled to fixed values ("Switch Rate Cap") as chunks were delivered to an APPLE IPAD SAFARI Browser AVPlayer over WiFi. Plot 802 depicts the switch rate cap over time. Plot 804 depicts the bandwidth of the communication channel as measured by the bandwidth measurement module 217. As shown in FIG. 8, it's value is slightly less than the "Switch Rate Cap" value shown in plot 802, as expected. The "Command Bitrate" depicted by plot 806 represents the commanded transcoder video bitrate, while the "Actual TS" depicted by plot rate 808 shows the measured media chunk bit rate. The scaled value of the picture vertical resolution ("10×Vert Res") of plot 810 is also shown where, e.g., the plot value 7200=720×10 corresponds to the 1280×720 video resolution. For this test, the "Switch Rate Cap" was driven to a low value that caused the algorithm to change to audio-only chunk delivery at 130-150 sec. In general, the server-side ABS rate control tracked the channel bandwidth and delivered media segments to prevent client player buffer overflow.

Figure 9:
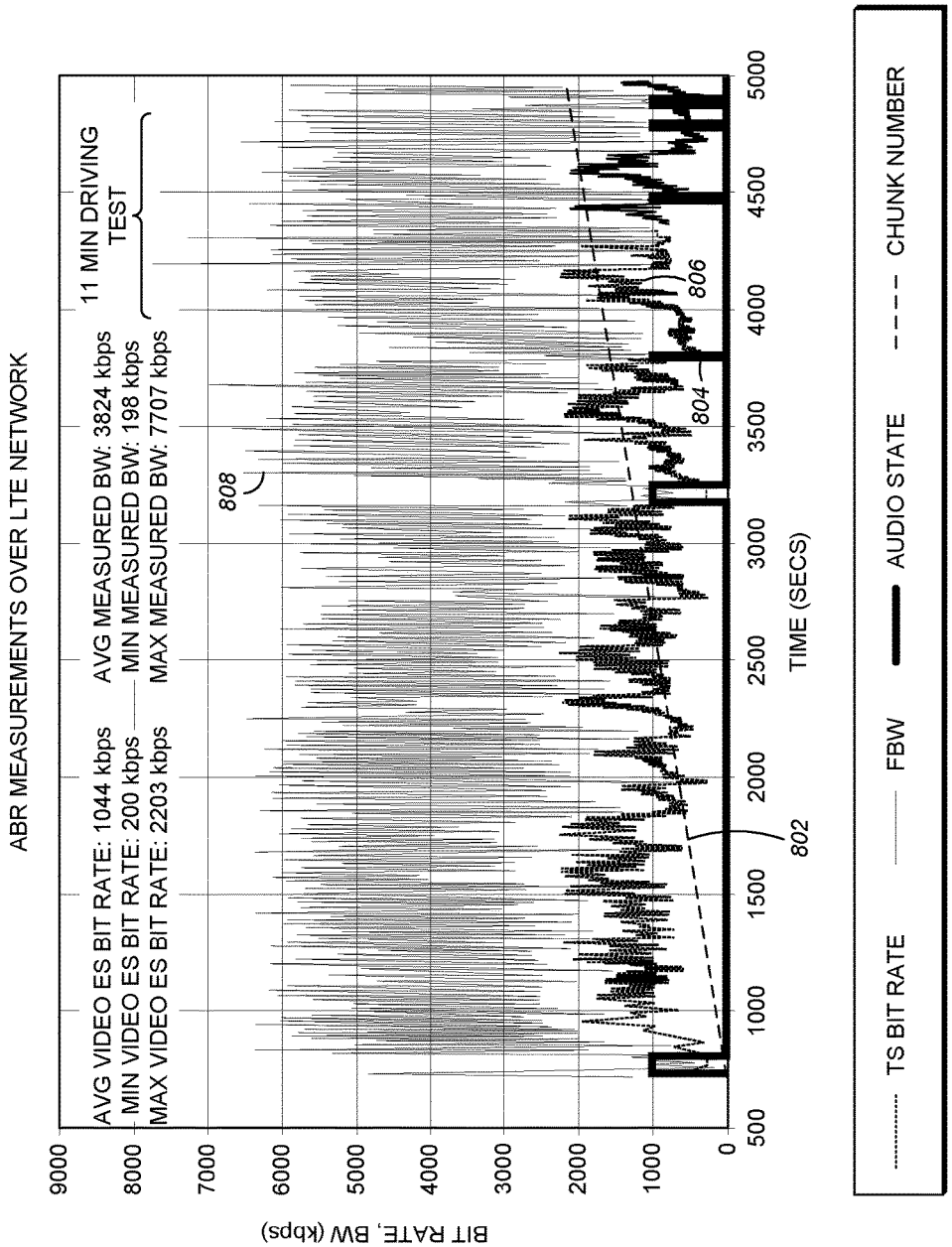
FIG. 9 is a diagram showing the transmission of data to a single client over an LTE cellular network to an tablet computing device.

FIG. 9 is a diagram showing the transmission of data to a single client over an LTE cellular network to an tablet computing device such as an IPAD. This test found the server-side ABR technique adjusting transcoded video elementary stream bit rate over a range of 200 kbps to 2.203 Mbps during a more than 1 hour test that included mobility (walking and freeway driving) as well as stationary viewing in home in the same session. Measured and filtered available network bandwidths varied from 198 kbps to 7.707 Mbps with an average of 3.824 Mbps. Plot 902 is a plot of the chunk number of the data transmitted. As shown, approximately 2000 chunks of data were transmitted during the illustrated interval. Plot 904 indicates periods when measured bandwidth was below the AOT, and the transcoder was commanded to transcode in the "audio only" state. Plot 908 indicates the filtered bandwidth measurements, and plot 906 indicates the TS bit rate, which was targeted to be a percentage of the measured bit rate.

Playlist Creation

For delivery of media segments using HLS, a playlist file must be created. For server-side dynamic ABR application, this playlist should typically be a "live" playlist in which media segments are advertised or published in the playlist file as they are created. A sliding window playlist consisting of 3 media URIs as in FIG. 2 may be used.

Audio-only Considerations

Tests demonstrated that when a single HLS stream carrying AAC audio and AVC video in MPEG-TS transitions to only AAC audio, the AVPlayer will not play smoothly unless certain criterion are met.

First, the program map table (PMT) for the audio-only chunks should contain references to only an audio packet identifier (PID). The PMT may contain reference to a PCR (system clock) PID that is not in the audio PID. Further, the PMT version number need not change from that of the previous audio-video portion of the MPEG-2 TS stream.

Second, the HLS playlist file should include an #EXT-X-DISCONTINUITY indicator tag preceding the first chunk that carries audio-only. This indicator tag, however, is not always required for acceptable playback when the stream transitions back from audio-only to audio-video.

Client-Side Assists

Server-side ABR provides robust dynamic control of streaming sessions but can benefit from status reports from the streaming client in the following ways.

Player Stalls when Used with WiFi

Many applications of HLS streaming to clients 204 utilize WiFi networks such as provided by WiFi hotspot 106 or WiFi router 112. A characteristic of WiFi is that it has limited coverage area. When a WiFi client 204 gets out-of-range or close to edge-of-coverage of the WiFi Access Point (AP), the delivered bit rate or network bandwidth may become very intermittent with lost connections being common. A client 202 using HLS might maintain TCP socket connections even when WiFi outages occur and continue to attempt to download HLS chunk segments for up to 60 seconds (observed) of WiFi outage. For a dynamic playlist utilizing 2-sec chunks this implies the client will be attempting to download a chunk that had expired and been removed from the current ABR server 202 playlist while the new playlist had moved on by up to 30 chunk durations. When the client 202 recovers it's WiFi connection in such an instance, it attempts to complete the old, expired chunk download, then recovers the new playlist and new chunks and tries to decode and render them. The ABR server 204 could abort the HTTP download of the expired chunk in anticipation of causing the player 210 to reacquire the latest manifest and chunks. It has also been observed that an HLS AVPlayer 210 will often render the reacquired media chunks without playing the audio track in such instances. A server-side only ABR implementation cannot force a player 210 to download chunks or reset itself, hence, a client-assist could be useful.

In such cases, a client playback management application 208 may restart the AVPlayer after short network outages, and query the AVPlayer 210 for statistics to feedback to the ABR server 202 such as the number of player stalls, number of downloaded chunks, and measured average bitrate. The ABR server 202 could supplement its transcoder controller 218 with such information (e.g., if player buffer stalls are reported, or the reported number of downloaded chunks does not agree with server-side values, the transcoder bit rate could be lowered, regardless of current network bandwidth measurement values indicating otherwise, in an attempt to facilitate rapid download of segments by the player 210).

Hardware Environment

Figure 10:
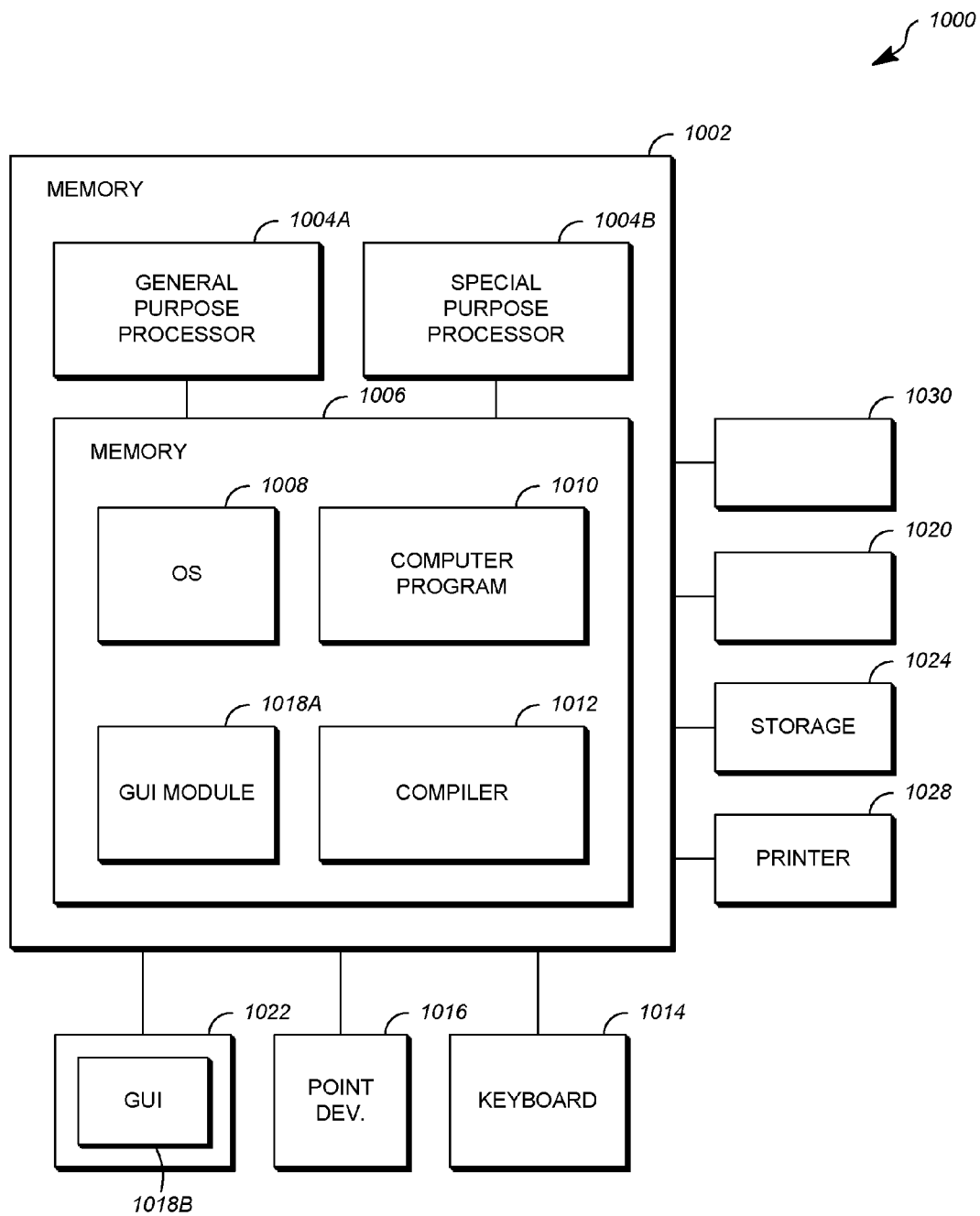
FIG. 10 is a diagram illustrating an exemplary computer system that could be used to implement elements of the present invention.

FIG. 10 is a diagram illustrating an exemplary computer system 100 that could be used to implement elements of the present invention, including the ABR server 202, client 204, and elements thereof. The computer 1002 comprises a general purpose hardware processor 1004A and/or a special purpose hardware processor 1004B (hereinafter alternatively collectively referred to as processor 1004) and a memory 1006, such as random access memory (RAM). The computer 1002 may be coupled to other devices, including input/output (I/O) devices such as a keyboard 1014, a mouse device 1016 and a printer 1028.

In one embodiment, the computer 1002 operates by the general purpose processor 1004A performing instructions defined by the computer program 1010 under control of an operating system 1008. The computer program 1010 and/or the operating system 1008 may be stored in the memory 1006 and may interface with the user and/or other devices to accept input and commands and, based on such input and commands and the instructions defined by the computer program 1010 and operating system 1008 to provide output and results.

Output/results may be presented on the display 1022 or provided to another device for presentation or further processing or action. In one embodiment, the display 1022 comprises a liquid crystal display (LCD) having a plurality of separately addressable pixels formed by liquid crystals. Each pixel of the display 1022 changes to an opaque or translucent state to form a part of the image on the display in response to the data or information generated by the processor 1004 from the application of the instructions of the computer program 1010 and/or operating system 1008 to the input and commands. Other display 1022 types also include picture elements that change state in order to create the image presented on the display 1022. The image may be provided through a graphical user interface (GUI) module 1018A. Although the GUI module 1018A is depicted as a separate module, the instructions performing the GUI functions can be resident or distributed in the operating system 1008, the computer program 1010, or implemented with special purpose memory and processors.

Some or all of the operations performed by the computer 1002 according to the computer program 1010 instructions may be implemented in a special purpose processor 1004B. In this embodiment, some or all of the computer program 1010 instructions may be implemented via firmware instructions stored in a read only memory (ROM), a programmable read only memory (PROM) or flash memory within the special purpose processor 1004B or in memory 1006. The special purpose processor 1004B may also be hardwired through circuit design to perform some or all of the operations to implement the present invention. Further, the special purpose processor 1004B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 1002 may also implement a compiler 1012 which allows an application program 1010 written in a programming language such as COBOL, C++, FORTRAN, or other language to be translated into processor 1004 readable code. After completion, the application or computer program 1010 accesses and manipulates data accepted from I/O devices and stored in the memory 1006 of the computer 1002 using the relationships and logic that was generated using the compiler 1012.

The computer 1002 also optionally comprises an external communication device such as a modem, satellite link, Ethernet card, or other device for accepting input from and providing output to other computers.

In one embodiment, instructions implementing the operating system 1008, the computer program 1010, and/or the compiler 1012 are tangibly embodied in a computer-readable medium, e.g., data storage device 1020, which could include one or more fixed or removable data storage devices, such as a zip drive, floppy disc drive 1024, hard drive, CD-ROM drive, tape drive, or a flash drive. Further, the operating system 1008 and the computer program 1010 are comprised of computer program instructions which, when accessed, read and executed by the computer 1002, causes the computer 1002 to perform the steps necessary to implement and/or use the present invention or to load the program of instructions into a memory, thus creating a special purpose data structure causing the computer to operate as a specially programmed computer executing the method steps described herein. Computer program 1010 and/or operating instructions may also be tangibly embodied in memory 1006 and/or data communications devices 1030, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 1002.

Although the term "computer" is referred to herein, it is understood that the computer may include portable devices such as cellphones, portable MP3 players, video game consoles, notebook computers, pocket computers, or any other device with suitable processing, communication, and input/output capability.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A method of adaptively transmitting streaming data to a client, comprising:
   receiving, in a server, a request for a data asset from the client;
   transcoding at least a segment of the data asset according to initial transcoding parameters;
   transmitting a first fragment of the transcoded segment of the data asset from the server to the client over a communication channel;
   generating an estimate of a bandwidth of the communications channel at least in part from information acknowledging reception of at least the first fragment of the transcoded segment of the data asset by the client;
   generating adaptive transcoding parameters at least in part from the estimate of a bandwidth of the communications channel, the estimate generated at the server;
   transcoding a further segment of the data asset according to the adaptive transcoding parameters; and
   transmitting the further segment of the data asset,
   wherein the adaptive transcoding parameters are generated from a low pass filtered version of the estimate of the bandwidth of the communications channel,
   wherein the low pass filter is a sliding n-tap median filter operating on the estimate of the bandwidth of the communication channel and temporally previous n−1 estimates of the bandwidth of the communication channel, and
   wherein the low pass filter is an exponential filter according to $FBW_{n+1} = \alpha BW_n + (1-\alpha)FBW_n$ wherein $BW_n$ is the unfiltered bandwidth measurement n and $FBW_{n+1}$ is the filtered bandwidth at n+1 and a is a filter gain.

2. The method of claim 1, further comprising:
   in response to the request for the data asset, generating a manifest for the requested data asset and transmitting the manifest of the requested data asset to the client, the manifest comprising an identifier of the segment of the data asset;
   receiving a request for the segment of the data asset from the client; and
   after transcoding a further segment of the data according to the adaptive transcoding parameters, generating an updated manifest for the requested data asset and transmitting the manifest of the requested data asset to the client, the manifest comprising an identifier of the transcoded further segment of the data asset.

3. The method of claim 1, wherein:
   the acknowledgement information comprises two acknowledgement messages, and the estimate of the bandwidth of the communications channel is generated according to a number of bytes acknowledged in a time interval between the two acknowledgement message.

4. The method of claim 1, wherein the further segments of the data asset are transcoded according to a low pass filtered estimate of the bandwidth of the communications channel.

5. The method of claim 1, wherein the initial encoding parameters are selected according to a transmission of a previously transmitted segment of the data asset of the same communication channel.

6. The method of claim 1, wherein the low pass filter is a p-term moving average filter.

7. The method of claim 1, wherein the low pass filter is a sliding n-tap median filter operating on the estimate of the bandwidth of the communication channel and temporally previous n−1 estimates of the bandwidth of the communication channel.

8. A method of adaptively transmitting streaming data to a client, comprising:
   receiving, in a server, a request for a data asset from the client;
   transcoding at least a segment of the data asset according to initial transcoding parameters;
   transmitting a first fragment of the transcoded segment of the data asset from the server to the client over a communication channel;
   generating an estimate of a bandwidth of the communications channel at least in part from information acknowledging reception of at least the first fragment of the transcoded segment of the data asset by the client;
   generating adaptive transcoding parameters at least in part from the estimate of a bandwidth of the communications channel, the estimate generated at the server;
   transcoding a further segment of the data asset according to the adaptive transcoding parameters;
   transmitting the further segment of the data asset, wherein the adaptive transcoding parameters are generated from a low pass filtered version of the estimate of the bandwidth of the communications channel, and wherein the low pass filter is a sliding n-tap median filter operating on the estimate of the bandwidth of the communication channel and temporally previous n−1 estimates of the bandwidth of the communication channel;

determining if a value of the low pass filtered version of the estimate of the communications channel differs from a temporally immediately preceding value of the low pass filtered version of the estimate of the communications channel by a threshold value; and transcoding the further segment of the data asset according to adaptive transcoding parameters generated at least in part from the low pass filtered version of the estimate of the bandwidth of the communications channel only if the value of the low pass filtered version of the estimate of the communications channel differs from a temporally immediately preceding value of the low pass filtered version of the estimate of the bandwidth of the communications channel by a threshold value, otherwise transcoding the further segment of the data asset according to adaptive transcoding parameters generated at least in part from the immediately preceding value of the low pass filtered version of the estimate of the bandwidth communications channel.

9. A method of adaptively transmitting streaming data to a client, comprising:

receiving, in a server, a request for a data asset from the client;

transcoding at least a segment of the data asset according to initial transcoding parameters;

transmitting a first fragment of the transcoded segment of the data asset from the server to the client over a communication channel;

generating an estimate of a bandwidth of the communications channel at least in part from information acknowledging reception of at least the first fragment of the transcoded segment of the data asset by the client;

generating adaptive transcoding parameters at least in part from the estimate of a bandwidth of the communications channel, the estimate generated at the server;

transcoding a further segment of the data asset according to the adaptive transcoding parameters;

transmitting the further segment of the data asset, wherein the adaptive transcoding parameters are generated from a low pass filtered version of the estimate of the bandwidth of the communications channel, and wherein the low pass filter is a sliding n-tap median filter operating on the estimate of the bandwidth of the communication channel and temporally previous n−1 estimates of the bandwidth of the communication channel; and determining if the estimate of the bandwidth of the communications channel exceeds a temporally immediately preceding estimate of the bandwidth of the communications channel, and;

if the estimate of the bandwidth of the communications channel exceeds the temporally immediately preceding estimate of the bandwidth of the communications channel, generating the adaptive transcoding parameters to increase the transcoding bitrate or resolution over a preceding transcoding bitrate or resolution at a geometric rate up to a maximum transcoding bit rate; and if the estimate of the bandwidth of the communications channel is less than the temporally immediately preceding estimate of the bandwidth of the communications channel, generating the adaptive transcoding parameters to decrease the transcoding bitrate or resolution over a preceding transcoding bitrate or resolution at an instant rate.

\* \* \* \* \*